United States Patent
Wax et al.

[11] Patent Number: 6,112,095
[45] Date of Patent: Aug. 29, 2000

[54] SIGNATURE MATCHING FOR LOCATION DETERMINATION IN WIRELESS COMMUNICATION SYSTEMS

[75] Inventors: Mati Wax, San Ramon; Oliver Hilsenrath, Alamo, both of Calif.

[73] Assignee: US Wireless Corporation, San Ramon, Calif.

[21] Appl. No.: 09/115,460

[22] Filed: Jul. 14, 1998

Related U.S. Application Data

[63] Continuation-in-part of application No. 08/780,565, Jan. 8, 1997, Pat. No. 6,026,304.

[51] Int. Cl.[7] .................................................. H04Q 7/20
[52] U.S. Cl. ......................... 455/456; 455/115; 455/67.1
[58] Field of Search ................................. 455/456, 457, 455/67.1, 115, 560, 63; 370/334, 335, 342, 310; 342/457, 372, 387, 458

[56] References Cited

U.S. PATENT DOCUMENTS

| | | | |
|---|---|---|---|
| 4,750,147 | 6/1988 | Roy, III et al. | 708/801 |
| 5,327,144 | 7/1994 | Stilp et al. | 342/387 |
| 5,461,610 | 10/1995 | Weerackody | 370/342 |
| 5,512,908 | 4/1996 | Herrick | 342/387 |
| 5,515,378 | 5/1996 | Roy, III et al. | 370/334 |
| 5,546,090 | 8/1996 | Roy, III et al. | 342/174 |
| 5,548,583 | 8/1996 | Bustamante | 370/335 |
| 5,570,412 | 10/1996 | LeBlanc | 379/58 |
| 5,592,490 | 1/1997 | Barratt et al. | 370/310 |
| 5,634,199 | 5/1997 | Gerlach et al. | 455/63 |
| 5,987,378 | 11/1999 | Schipper et al. | 701/201 |

*Primary Examiner*—Dwayne D. Bost
*Assistant Examiner*—Joy Redmon
*Attorney, Agent, or Firm*—Lumen Intellectual Property Services

[57] ABSTRACT

A method and apparatus for wireless location finding determines a set of likely locations from a signal covariance matrix R, a set of array calibration vectors $\{a(\theta)\}$, and a set of calibrated signal covariance matrices $\{R_k\}$ corresponding to calibrated locations. From these quantities, an angular energy distribution function $B(\theta)$ is calculated from R and $a(\theta)$, and compared to a set of calibrated angular energy distribution functions $B_1(\theta), \ldots, B_N(\theta)$ corresponding to the set of calibrated signal covariance matrices $R_1, \ldots, R_N$. The function $B(\theta)$ is then compared with each of the calibrated functions $B_1(\theta), \ldots, B_N(\theta)$ to determine those calibrated functions that most closely match the calculated function $B(\theta)$. From these calculations a set of likely locations is then determined.

10 Claims, 5 Drawing Sheets

SIGNATURE MATCHING FOR LOCATION DETERMINATION IN WIRELESS COMMUNICATION SYSTEMS

This application is a continuation-in-part of U.S. patent application Ser. No. 08/780,565, filed Jan. 8, 1997 now U.S. Pat. No. 6,026,304, which is incorporated herein by reference.

FIELD OF THE INVENTION

This invention relates generally to methods for passively determining the location of a radio transmitter. More particularly, it relates to computationally inexpensive methods for accurately determining cellular telephone locations in real time.

BACKGROUND OF THE INVENTION

In wireless radio communication systems, such as cellular telephone networks, it is generally recognized that there is a great need and utility for accurately determining in real time the location of mobile radio transmitters, such as cellular phone handsets and pagers. For example, U.S. Pat. No. 5,512,908 to Herrick mentions the application of cellular location information to 911 dispatching, tracking unauthorized cell phone usage, and tracking or locating commercial and/or government vehicles. U.S. Pat. No. 5,327,144 to Stilp et al. also mentions various applications of mobile location information, such as locating lost or stolen vehicles, assisting lost motorists, and dispatching emergency vehicles.

All of the above location-based services, however, depend fundamentally on the ability to obtain consistent and accurate location information in a wide range of environments. Although conventional techniques for location finding can provide location information in certain limited situations, they fail to provide accurate and reliable location information in many environments, particularly in urban environments where signal multipath is often severe. Urban environments, however, are the places where such services are often needed most.

In contrast to conventional techniques for location finding, Hilsenrath et al. in U.S. patent application Ser. No. 08/780,565 (which is not admitted to be prior art with regard to the present invention by its mention here) disclose a unique method for location finding that performs especially well in multipath environments, and requires only a single base station. While conventional wisdom views multipath signals as noise to be reduced, ignored, or eliminated, the method of Hilsenrath et al. takes advantage of multipath signals to help identify transmitter locations. Because signal signatures are naturally associated with locations by virtue of the spatial dependence of multipath, the base station can use this fact to determine a location by matching a measured signature with a particular calibrated signature in a database of signatures and corresponding locations.

Due to noise and other uncertainties, however, it can be difficult to ensure a reliable and unique match between a measured signature and one of the calibrated signatures, and thus obtain accurate and unambiguous location information.

SUMMARY OF THE INVENTION

Accordingly, it is a primary object of the present invention to provide a method and apparatus for wireless location finding that improves the overall accuracy, reliability, and computational efficiency of location finding systems. In one aspect of the present invention, a method and apparatus for wireless location finding determines a set of likely locations from a signal covariance matrix R, a set of array calibration vectors $\{a(\theta)\}$, and a set of calibrated signal covariance matrices $\{R_k\}$ corresponding to calibrated locations. From these quantities, an angular energy distribution function $B(\theta)$ is calculated from R and $a(\theta)$, and compared to a set of calibrated angular energy distribution functions $B_1(\theta), \ldots, B_N(\theta)$ corresponding to the set of calibrated signal covariance matrices $R_1, \ldots, R_N$. The function $B(\theta)$ is then compared with each of the calibrated functions $B_1(\theta), \ldots, B_N(\theta)$ to determine those calibrated functions that most closely match the calculated function $B(\theta)$. From these calculations a set of likely locations is then determined.

DETAILED DESCRIPTION

Although the present detailed description contains many specifics for the purposes of illustration, anyone of ordinary skill in the art will appreciate that many variations and alterations to the details are within the scope of the invention. Accordingly, the following embodiments of the invention are set forth without any loss of generality to, and without imposing limitations upon, the claimed invention.

Figure 1:
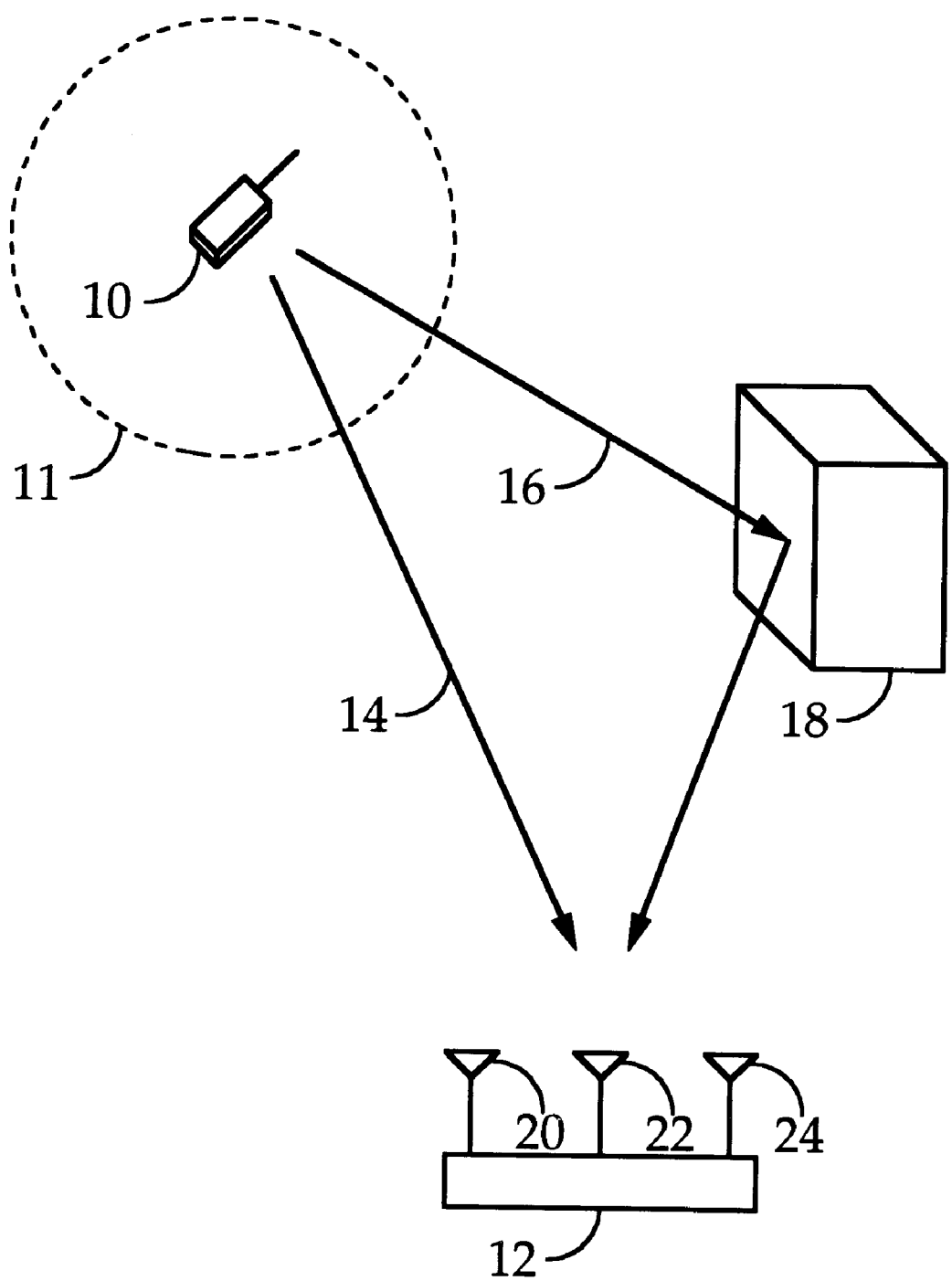
FIG. 1 illustrates a wireless communication system according to the present invention.

In a communication system according to a preferred embodiment of the invention, a cellular telephone 10 transmits a signal which travels through an environment and couples to an array of antennas 20, 22, 24 of a cellular telephone base station 12, as shown in FIG. 1. Typically, in addition to a direct path signal 14 from phone 10 to base 12, there may be additional multipath signals reflected from various environmental objects, for example, multipath signal 16 reflected from object 18. In addition, there are typically various smaller local scatterers (not shown) positioned within a region 11 around phone 10. Consequently, signals 14 and 16 may comprise components corresponding to these scattered signals.

Figure 2:
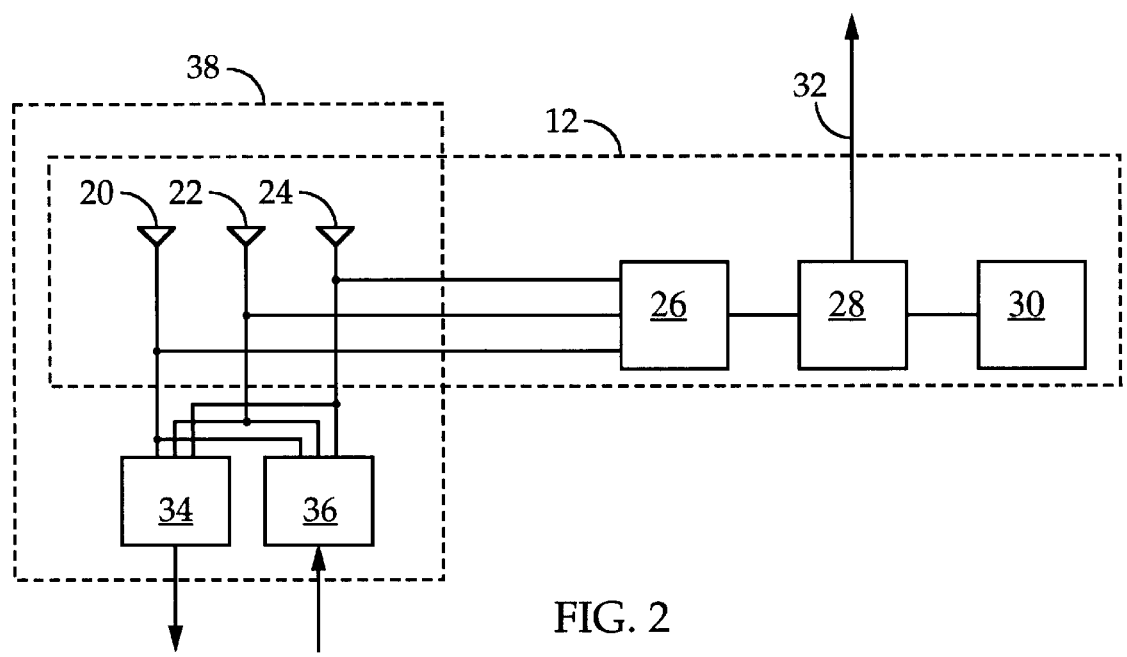
FIG. 2 is a block diagram of a location finding apparatus and base station according to the present invention.

As shown in FIG. 2, a location finding apparatus 12 includes a conventional multichannel receiver 26 which coherently receives signals from the antennas 20, 22, 24. The received signals are sent to multi-purpose signal processor 28 which performs signal signature identification, database searching, and other required processing as will be described in detail below. A memory device 30 is accessible by processor 28 and is used to store signal signature calibration data, location data, geographical map data, and/or other data as required. Location information determined by processor 28 is sent over external communication lines 32 for use by other systems. In the present embodiment, location finding apparatus 12 shares antennas with an existing cellular telephone base station 38, which has a multi-channel receiver 34 and multi-channel transmitter 36, among other components well-known in the art (not shown). Note, however, that location finding apparatus 12 need not be connected to an existing cellular base station 38, but can operate as a stand-alone device with its own antennas.

In general, the base station 12 has a number p of antennas forming an array. For illustrative purposes, however, the array is shown in the figures as having three antennas 20, 22, and 24. The p antennas are used to receive complex signal envelopes $x_1(t), x_2(t), \ldots, x_p(t)$, respectively, which are conventionally grouped together to form a p-dimensional array vector $x(t)=[x_1(t), x_2(t), \ldots, x_p(t)]^T$. In general, the dimension of the array vector $x(t)$ is equal to p, the number of antennas in the array.

In a preferred embodiment, a batch of 100 array vectors is sampled in a 1 ms interval, and the outer products of these 100 vectors are combined to form a p×p covariance matrix for the batch. Since a batch is collected only once every 50 ms, and each batch spans only 1 ms, there is sufficient time using this technique to sample up to 50 different channels in a 50 ms interval. Those skilled in the art will appreciate that similar sampling methods may also be implemented using various other values for the time intervals, number of array vectors sampled per batch, etc. Although the present description is focused upon the processing of one signal, in the preferred embodiment, the techniques described herein can be applied in parallel to signals on up to 50 channels. It will be recognized by those skilled in the art that although this sampling procedure is appropriate for the AMPS cellular standard it can be adapted to various other modulation schemes as well. In the case of a CDMA cellular network, for example, spread spectrum signals from the antenna array are digitized and passed through synchronized multichannel despreaders to produce the p-dimensional array vectors $x(t)$ corresponding to each mobile. These vectors can then be sampled and used to form a covariance matrix for each batch in the manner outlined above. For a given mobile, a collection of the covariance matrices for various batches are then averaged over the course of a few seconds to form a p×p signal covariance matrix, R, which is normalized such that Tr R=1. This normalized covariance matrix is used as the basis for subsequent calculations, as will be described below.

In one technique, the location of a mobile is determined from its covariance matrix R through the use of a database containing N calibrated signal signatures and associated locations, as shown in TABLE 1.

TABLE 1

| Location | Signal Signature | | |
|---|---|---|---|
| (x, y, z) | Subspace | Time Delays | Covariance |
| $d_1$ | $U_1$ | $\tau_1$ | $R_1$ |
| . | . | . | . |
| . | . | . | . |
| . | . | . | . |
| $d_N$ | $U_N$ | $\tau_N$ | $R_N$ |

The locations $d_1, \ldots, d_N$ may be two or three dimensional, and may be assigned a date upon which it was last calibrated. Each location $d_i$ has an associated signal signature that characterizes the structure of the signal from that location. This signal signature may include information such as a signal subspace $U_i$, a set of differential time delays $\tau_i$, and a calibrated covariance matrix $R_i$.

Although this database may be generated by various techniques, in the preferred embodiment it is generated by an empirical calibration procedure, as follows. A cellular phone and a global positioning system (GPS) receiver are placed in a vehicle which moves to various locations in a geographical region of interest. The GPS data are periodically stored and time-stamped using the GPS clock. Meanwhile, the transmitted signal from the cellular phone is received at the base station, which is also equipped with a GPS receiver, and the signal covariance matrix R is also time stamped with the GPS clock and stored. When the mobile returns, the stored data is post-processed using differential GPS correction data obtained from the base station to determine with high accuracy the location corresponding to each covariance matrix R. This data is then used to construct the calibration table database.

The signal subspace $U_i$ for a location is determined from the dominant eigenvectors of $R_i$. The dominant eigenvectors are defined as the eigenvectors of $R_i$ corresponding to the largest eigenvalues that collectively capture at least certain amount, e.g. 90%, of the total signal energy. It should be emphasized that the signal subspace may be determined by various different criteria as well.

In one approach to location finding, the location of a mobile phone in the service area may be determined in real time as follows. Signals originating from a phone 10 at an unknown location are received at the base station 12 by multichannel receiver 26. The signal processor 28 at the base station then determines the signal covariance matrix R as described in detail above. The covariance matrix R is then compared with the set of N calibrated signal subspaces $\mathcal{U}=\{U_1, \ldots, U_N\}$ which are stored along with the associated set of N known locations $\mathcal{D}=\{d_1, \ldots, d_N\}$ in a calibration database. The measure of similarity between covariance matrix R and a given calibrated signature $U_i$ may be determined by evaluating a function $L_R$ at a location index i, $$L_R(i)=\text{Tr}\{P_i R\}=\text{Tr}\{U_i U_i^H R\},$$

where $P_i=U_i U_i^H$ is the projector onto the subspace $U_i$. The value of $L_R(i)$ measures the degree to which the measured signal covariance R coincides with the $i^{th}$ calibrated subspace $U_i$, and represents the likelihood that the mobile is at or near calibrated location $d_i$. In another embodiment, the value of $L_R(i)$ is given by the product of the non-zero eigenvalues of $P_i R$, that is, $$L_R(i) = \prod_j \Gamma_{ij}.$$

where $\{\Gamma_{ij}\}$ are the non-zero eigenvalues of $P_i R$.

By calculating the value of $L_R(i)$ for all N locations, a set of likely locations can be selected by taking, for example, those locations such that the projection of the signal covariance R upon the corresponding subspaces in $\mathcal{U}$ is greater than a certain predetermined threshold value T. The actual location of the phone will be one of these likely locations Additional processing and/or comparison with data from other sources may be used to reduce the number of likely locations in order to provide an estimated location with a high degree of confidence.

In accordance with the present invention, the above approach to location-finding may be supplemented or replaced by various other techniques, depending on the circumstances. In certain situations, a more accurate and reliable technique may be used, as described below.

Figure 5:
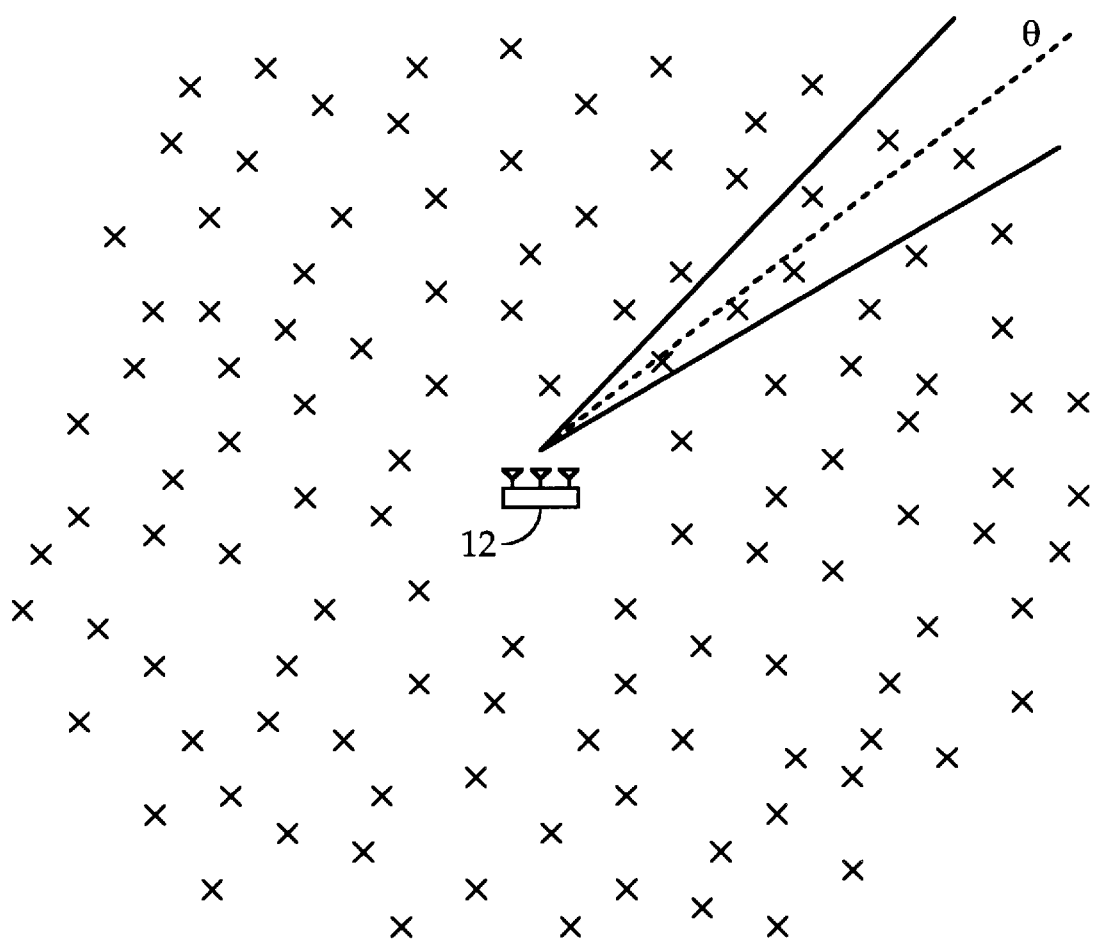
FIG. 5 is a picture of an angular sector of a base station service area containing various calibrated locations, in accordance with the invention.

The following approach to location-finding is based on prior knowledge of a set of array manifold vectors $\{a(\theta)\}_{\theta=1,\ldots,360}$. This set of vectors may be determined empirically through array calibration procedures well-known in the art. Alternatively, it may be determined from the signature calibration table, as follows. As described earlier the service region contains a set of calibrated locations, represented in FIG. 5 by "X" marks. Consider an angular sector of the service region of a base station 12, as shown in FIG. 5. The angular sector has an angular width $\Delta\theta$ and is centered around an angle $\theta$. In the preferred embodiment the value for $\Delta\theta$ is one degree. This particular value, however, is not necessary for the practice of the present invention, and various other values will work as well. Contained within this sector are several calibrated locations $d_1, \ldots, d_K$, having corresponding calibrated signature subspaces $U_1, \ldots, U_K$. After these subspaces have been identified for a given sector, each subspace $U_i$ is examined to determine if its largest eigenvector $e_i$ has a magnitude significantly larger than the other eigenvectors in the same subspace. For example, if the largest eigenvector exceeds the next largest eigenvector by a predetermined factor, then it is considered to be significantly larger than all the other eigenvectors. The result of this examination of the subspaces results in a set of largest eigenvectors. For example, if all the subspaces have significantly large first eigenvectors, then the set of largest eigenvectors will contain one eigenvector from each subspace, $e_1, \ldots, e_K$. These eigenvectors are then combined to form an average eigenvector for the sector, $e_{av}$. Various techniques can be used to determine $e_{av}$ from $e_1, \ldots, e_K$. For example, the K eigenvectors can be stacked in a matrix, and the singular value decomposition of the matrix can be calculated to determine the best rank-1 approximation to the matrix. This best rank-1 approximation is then used as the value for $e_{av}$. A more accurate estimate of $e_{av}$ can be determined by using the initial estimate of $e_{av}$ to exclude some outlying eigenvectors from the set of K eigenvectors and then repeating the procedure. The final value of $e_{av}$ for the sector is used as an initial estimate for the array calibration vector $a(\theta)$ for the sector. This estimate may be improved by imposing a continuity condition on the values of $a(\theta)$ with respect to $\theta$. The above procedure, therefore, can derive a set of array calibration vectors for the base station, which may be stored by the location finding system in a table, as shown in TABLE 2 below.

TABLE 2

| Direction $\theta$ | Array Calibration Vector $a(\theta)$ |
|---|---|
| 1 | a(1) |
| . | . |
| . | . |
| . | . |
| 360 | a(360) |

It should be noted that the above technique for generating array calibration vectors from the location database has several important advantages over known methods of generating array calibration vectors. Prior techniques typically require that the array be installed and measured in a special antenna range. The known methods are not useful, therefore, with many existing antenna arrays. The present method, on the other hand, is effective with existing antenna arrays since no restriction is being made on the nature of the array or its supporting structure.

Once the set of array manifold vectors $\{a(\theta)\}_{\theta=1,\ldots,360}$ has been determined, whether by one of the above techniques or by some other technique, the set can be used for real-time location-finding. A phone having an unknown location transmits a signal received at the location-finding system, as described in detail above. The covariance matrix R for the phone is measured, and an angular energy distribution $B(\theta)$ for the signal is calculated for each value of $\theta$ from 1 to 360. In the preferred embodiment, the angular energy distribution is calculated with a beamforming metric:

$$B(\theta)=a(\theta)^H R a(\theta),$$

Figure 4:
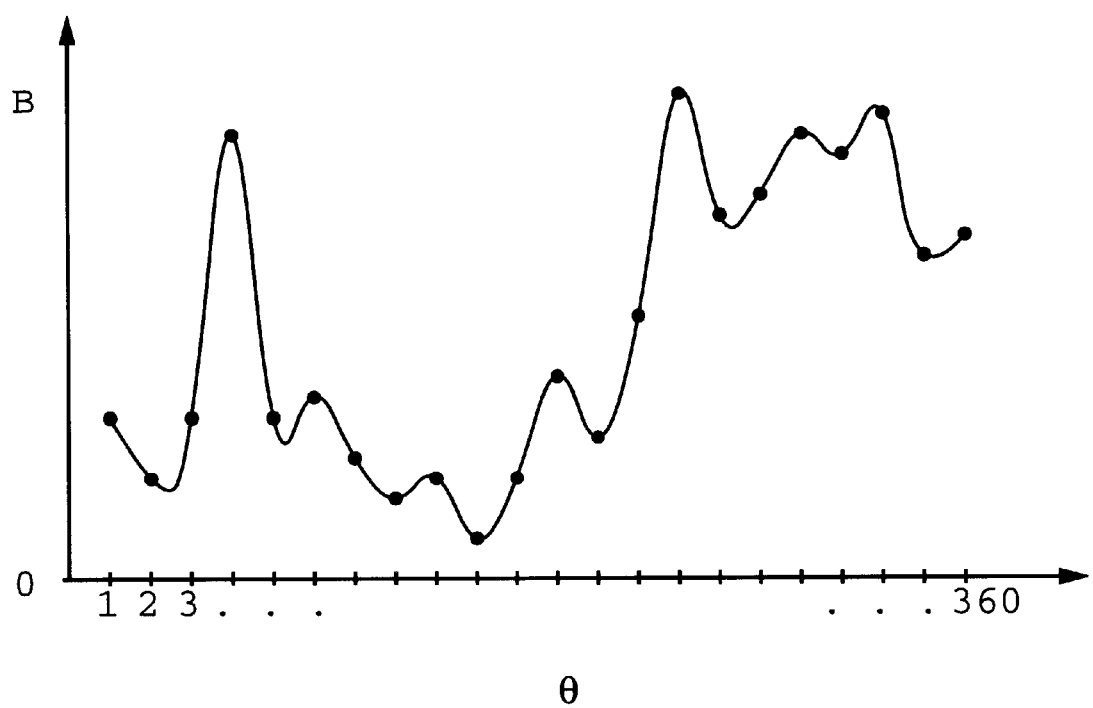
FIG. 4 is a graph of a function representing how a signal strength measure depends on its angular position with respect to an antenna array according to the present invention.

Alternatively, any high resolution angular energy distribution metric can be used, such as the MUSIC metric, $$B(\theta)=a(\theta)^H U U^H a(\theta),$$

where U is the matrix of the dominant eigenvectors of R. A graph of a typical angular energy distribution function is shown in FIG. 4.

A similar function can be calculated for each of the calibrated signal covariance matrices $R_1, \ldots, R_N$. One then obtains a set of N angular energy distribution functions corresponding to the set of N calibrated locations. For the beamforming metric, one calculates $$B_1(\theta)=a(\theta)^H R_1 a(\theta), \ldots, B_N(\theta)=a(\theta)^H R_N a(\theta).$$

Alternatively, for the MUSIC metric one calculates $$B_1(\theta)=a(\theta)^H U_1 U_1^H a(\theta), \ldots, B_N(\theta)=a(\theta)^H U_N U_N^H a(\theta)$$

where $U_k$ is the matrix of the dominant eigenvectors of $R_k$. This set of functions is preferably calculated in advance and stored in the calibration table.

In a preferred embodiment, a set of likely locations $\mathcal{U}'=\{d'_1, \ldots, d'_N\}$ is determined by comparing the angular energy distribution $B(\theta)$ of the signal from the phone with the calibrated angular energy distributions $B_1(\theta), \ldots, B_N(\theta)$. In the preferred embodiment, these distributions are compared by using a statistical metric G defined on the space of angular energy distribution functions to measure the similarity between B and each of the calibrated distributions $B_1, \ldots, B_N$. For example, the metric G can be defined by the squared differece:

$$G(B, B_k)=\Sigma|B(\theta)-B_k(\theta)|^2,$$

where the sum is over all angles $\theta=1, \ldots 360$. Alternatively, the metric G can be defined as the Kullback-Liebler distance or other metric.

Figure 3A:
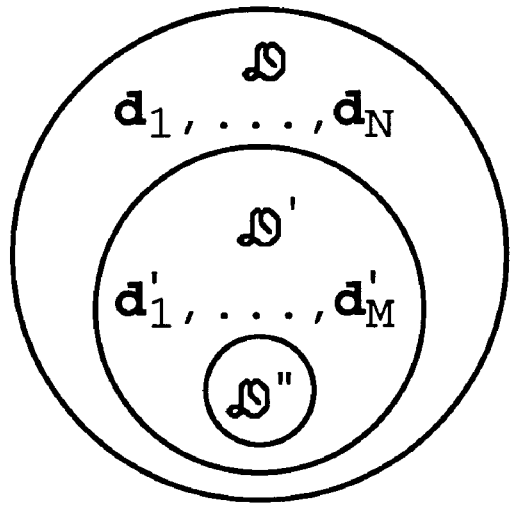
FIGS. 3A–3B illustrate the relationship between sets of data according to the present invention.
Figure 3B:
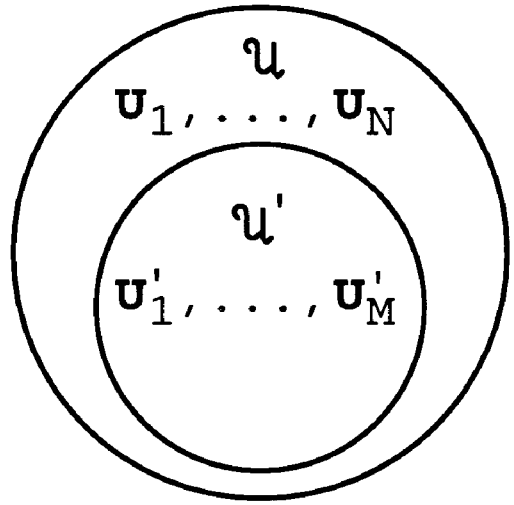

The set of likely locations is then selected to be the set of locations $d_k$ for which the distance $G(B, B_k)$ is below some threshold. In formal terms, $$\mathcal{D}=\{d_k \text{ in } \mathcal{D}: G(B, B_k)<C\},$$

where C is some predetermined threshold distance (in the sense of G). Appropriate adjustment of H is determined by the degree of tolerance desired in the location-finding application at hand, and is preferably selected so that the set of likely locations has a very small number of locations compared to the total number of possible locations. The set of calibrated subspaces corresponding to the set of likely locations $\mathcal{U}'$ is denoted $\mathcal{D}'=\{U_k \text{ in } \mathcal{D}: G(B, B_k)<C\}$. These sets are shown in FIGS. 3A and 3B.

If the number of likely locations is one, this location is most probably the actual location of the phone. If there are multiple likely locations, then various methods may be used to reduce the location ambiguity.

For example, the set of likely locations can be compared with a set of locations determined independently by another location-finding system. The ambiguity can also be reduced by statistical methods that track the set of likely locations over time. Another technique for reducing the ambiguity is to evaluate other measures of similarity, as described earlier. For example, one can define $$\mathcal{U}''=\{d'_k \text{ in } \mathcal{U}': L_R(k)>T\},$$

where T is a predetermined threshold value. Recall that the quantity $L_R(k)$ is a measure of the degree to which the measured signal covariance R coincides with the $k^{th}$ calibrated subspace, and represents the likelihood that the mobile phone is near the calibrated location $d_k$. The set $\mathcal{U}''$, therefore, contains those likely locations that have calibrated subspaces in coincidence with the measured signal covariance.

These and other techniques for reducing ambiguity may be used independently or together as needed.

It should be noted that the foregoing details may be varied in many ways without departing from the general spirit and scope of the invention. Accordingly, the scope of the present invention should be determined from the following claims and their legal equivalents.

What is claimed is:

1. In a system for wireless transmitter location finding, a method for calculating a set of likely locations of a transmitter, the method comprising:
   (a) measuring at a base station a signal covariance R associated with the transmitter;
   (b) evaluating a function $B(\theta)$ that measures an energy of the signal covariance R in an angular direction $\theta$ relative to the base station, wherein the evaluation of $B(\theta)$ uses an antenna array vector $a(\theta)$;
   (c) calculating a distance G between the function $B(\theta)$ and a function $B_k(\theta)$, where $B_k(\theta)$ measures an energy of a calibrated signal covariance $R_k$ in the angular direction $\theta$ relative to the base station, wherein the evaluation of $B(\theta)$ uses an antenna array vector $a(\theta)$, and wherein $R_k$ is a calibrated signal covariance associated with a location index k; and
   (d) selecting a set of location indices k such that the distance G between B and $B_k$ is small.

2. The method of claim 1 wherein $B(\theta)=a(\theta)^H R a(\theta)$ and $B_k(\theta)=a(\theta)^H R_k a(\theta)$.

3. The method of claim 1 wherein $B(\theta)=a(\theta)^H UU^H a(\theta)$ and $B_k(\theta)=a(\theta)^H U_k U_k^H a(\theta)$.

4. The method of claim 1 wherein the distance G is the squared difference between B and $B_k$.

5. The method of claim 1 wherein the distance G is the Kullback-Liebler distance between B and $B_k$.

6. An apparatus for location finding in a wireless communications system, the apparatus comprising:
   (a) a multichannel receiver for coherently receiving signals originating from a transmitter;
   (b) a signal processor connected to the multichannel receiver for determining a set of likely locations from the received signals; and
   (c) a memory device accessible by the processor for storing signal signature calibration data;
   wherein the signal processor determines the set of likely locations from the received signals in accordance with the following procedure:
      i) determining a signal covariance R from the signals received at the multichannel receiver;
      ii) evaluating a function $B(\theta)$ that measures an energy of the signal covariance R in an angular direction $\theta$ relative to the apparatus, wherein the evaluation of $B(\theta)$ uses an antenna array vector $a(\theta)$;
      iii) calculating a distance G between the function $B(\theta)$ and a function $B_k(\theta)$, where $B_k(\theta)$ measures an energy of a calibrated signal covariance $R_k$ in the angular direction $\theta$ relative to the apparatus, wherein an evaluation of $B(\theta)$ uses an antenna array vector $a(\theta)$, and wherein $R_k$ is a calibrated signal covariance associated with a location index k; and
      iv) selecting a set of location indices k such that the distance G between B and $B_k$ is small.

7. The apparatus of claim 6 wherein $B(\theta)=a(\theta)^H R a(\theta)$ and $B_k(\theta)=a(\theta)^H R_k a(\theta)$.

8. The apparatus of claim 6 wherein $B(\theta)=a(\theta)^H UU^H a(\theta)$ and $B_k(\theta)=a(\theta)^H U_k U_k^H a(\theta)$.

9. The apparatus of claim 6 wherein the distance G is the squared difference between B and $B_k$.

10. The apparatus of claim 6 wherein the distance G is the Kullback-Liebler distance between B and $B_k$.

* * * * *